ial) United States Patent  (10) Patent No.: US 9,720,405 B2
Kagawa et al. (45) Date of Patent: Aug. 1, 2017

(54) ANTENNA INSPECTION SYSTEM, ANTENNA INSPECTION APPARATUS AND ANTENNA INSPECTION METHOD (71) Applicants: Yoshihisa Kagawa, Tokyo (JP); Hiroyuki Sato, Tokyo (JP)

(72) Inventors: Yoshihisa Kagawa, Tokyo (JP); Hiroyuki Sato, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 544 days.

(21) Appl. No.: 14/383,695

(22) PCT Filed: Mar. 8, 2013

(86) PCT No.: PCT/JP2013/056398
§ 371 (c)(1),
(2) Date: Sep. 8, 2014

(87) PCT Pub. No.: WO2013/137126
PCT Pub. Date: Sep. 19, 2013

(65) Prior Publication Data
US 2015/0018997 A1 Jan. 15, 2015

(30) Foreign Application Priority Data
Mar. 13, 2012 (JP) ................. 2012-056450

(51) Int. Cl.
G06F 19/00 (2011.01)
G05B 19/418 (2006.01)
(Continued)

(52) U.S. Cl.
CPC ....... G05B 19/41875 (2013.01); G01M 11/00 (2013.01); G01S 3/325 (2013.01);
(Continued)

(58) Field of Classification Search
None
See application file for complete search history.

(56) References Cited

U.S. PATENT DOCUMENTS

2002/0164945 A1* 11/2002 Olsen ................ G01V 8/005
455/3.01
2006/0075631 A1 4/2006 Case et al.
(Continued)

FOREIGN PATENT DOCUMENTS

CN 101501508 A 8/2009
CN 101858781 A 10/2010
(Continued)

OTHER PUBLICATIONS

Office Action issued Feb. 2, 2017 in Chinese Patent Application No. 201380011164.8 (with English language translation).
(Continued)

Primary Examiner — Philip Wang
(74) Attorney, Agent, or Firm — Oblon, McClelland, Maier & Neustadt, L.L.P.

(57) ABSTRACT

A POL-axis driving unit, an EL-axis driving unit, a Cross-EL-axis driving unit and an AZ-axis driving unit of an antenna apparatus drive respective axis drive motors controlled by a control unit of a control apparatus, such that the antenna performs an origin detection operation for each axis. The camera control unit controls a camera so as to capture an image of the antenna at each timing before and after the origin detection for each axis. An image acquisition unit of an antenna inspection acquires image data that indicates the image of the antenna captured by the camera and makes storage unit store the image data. A comparing diagnosis unit compares image data before the origin detection for each axis with image data after the origin detection, and diagnoses whether the antenna is in a normal state.

11 Claims, 4 Drawing Sheets (51) Int. Cl.
*H01Q 3/08* (2006.01)
*H01Q 1/12* (2006.01)
*H01Q 1/42* (2006.01)
*G01M 11/00* (2006.01)
*G01S 3/32* (2006.01)
*G06K 9/62* (2006.01)
*G06K 9/78* (2006.01)
*H01Q 3/02* (2006.01)
*H04N 7/18* (2006.01)
*G05B 23/02* (2006.01)
*G06T 7/70* (2017.01)

(52) U.S. Cl.
CPC ....... *G05B 23/0218* (2013.01); *G06K 9/6201* (2013.01); *G06K 9/78* (2013.01); *G06T 7/70* (2017.01); *H01Q 1/125* (2013.01); *H01Q 1/42* (2013.01); *H01Q 3/02* (2013.01); *H01Q 3/08* (2013.01); *H04N 7/183* (2013.01); *G05B 2219/31304* (2013.01)

(56) References Cited

U.S. PATENT DOCUMENTS

| | | | | |
|---|---|---|---|---|
| 2008/0284669 | A1* | 11/2008 | Hunton | H01Q 1/22 343/757 |
| 2009/0231217 | A1 | 9/2009 | Grange et al. | |
| 2011/0151932 | A1* | 6/2011 | Kim | H01Q 3/005 455/562.1 |
| 2015/0018997 | A1* | 1/2015 | Kagawa | H01Q 1/125 700/108 |
| 2016/0043814 | A1* | 2/2016 | Bishop | H04W 24/00 370/242 |

FOREIGN PATENT DOCUMENTS

| | | |
|---|---|---|
| CN | 102187597 A | 9/2011 |
| JP | 61 12311 | 4/1986 |
| JP | 63 67901 | 3/1988 |
| JP | 63 252020 | 10/1988 |
| JP | 7 326919 | 12/1995 |
| JP | 9 294011 | 11/1997 |
| JP | 2000 171224 | 6/2000 |
| JP | 2008 228045 | 9/2008 |
| JP | 2011 87044 | 4/2011 |
| JP | 2011 149571 | 8/2011 |

OTHER PUBLICATIONS

Extended European Search Report issued Jun. 9, 2016 in Patent Application No. 13761991.2.

Office Action issued on Aug. 12, 2016 in Chinese Patent Application No. 201380011164.8 with English translation.

Combined Office Action and Search Report issued Jan. 4, 2016 in Chinese Patent Application No. 201380011164.8. (with English language translation and English Translation of Category of Cited Documents).

International Search Report Issued Apr. 16, 2013 in PCT/JP13/056398 Filed Mar. 8, 2013.

Office Action issued Feb. 27, 2017 in Chinese Patent Application No. 201380011164.8 (with English language translation).

* cited by examiner

ANTENNA INSPECTION SYSTEM, ANTENNA INSPECTION APPARATUS AND ANTENNA INSPECTION METHOD

TECHNICAL FIELD

The present invention relates to an antenna inspection system, antenna inspection apparatus, antenna inspection method and program for diagnosing abnormal conditions of an antenna.

BACKGROUND ART

There is a kind of antennas, that is, automatic tracking antennas either with a four-axis drive system consisting of an AZ (azimuth) drive axis, an EL (elevation) drive axis, a Cross-EL (cross-elevation) drive axis and a POL (polarization) drive axis, or with a three-axis drive system consisting of an AZ drive axis, an EL drive axis and a POL drive axis. In particular, satellite tracking antenna apparatuses are needed to have mechanical strength that can be secured even under severe vibration conditions, and are needed to have long operating life and high reliability. Furthermore, being low in cost, small in size and low in weight is demanded (for example, see Patent Literature 1).

In maintaining of antennas, visual inspection is conducted to determine whether or not an antenna is in abnormal conditions by checking the appearance of the antenna. Patent Literature 2 discloses a method of performing maintenance by detaching units of an antenna with a three-axis drive system consisting of an AZ drive axis, a Cross-EL drive axis and an EL drive axis. Additionally, a visual inspection apparatus that uses a camera to capture an image of an object to be inspected and uses this captured image to inspect the object is generally known. In using such a visual inspection apparatus, users are required to determine whether or not an antenna is in abnormal conditions by viewing. In other ways, in the case of automatic detection of abnormal conditions, it is needed, for example, to capture an image of an object to be inspected that is in a normal state in advance, to execute image-processing on the image data captured in advance and image data of the object that is captured when visual inspection is conducted, and to determine whether or not the object is in abnormal conditions based on prescribed determination criteria.

For example, Patent Literature 3 discloses an appearance inspection apparatus that displays on a monitor an image of an object to be inspected captured by a CCD camera to allow observation and inspection of the state of the object. Patent Literature 4 discloses an image processing device that has detection means for detecting image information regarding a test object, detects image information regarding a predetermined standard detection target that is used as the test object, obtains difference data that corresponds to differences from image information that is detected in advance regarding the predetermined standard detection target, and displays image information that is based on the difference data.

CITATION LIST

Patent Literature

Patent Literature 1: Unexamined Japanese Patent Application Kokai Publication No. 2008-228045
Patent Literature 2: Unexamined Japanese Patent Application Kokai Publication No. 2011-87044
Patent Literature 3: Unexamined Japanese Patent Application Kokai Publication No. 2000-171224
Patent Literature 4: Examined Japanese Patent Application Publication No. S61-12311

SUMMARY OF INVENTION

Technical Problem

When inspecting an antenna apparatus by the above-described visual inspection method, it is necessary for a user to detect abnormal conditions by viewing. In the case of automatically detecting abnormal conditions of an antenna apparatus from a captured image of the antenna apparatus, storing a large amount of image data captured in various operation stages is needed to diagnose abnormal conditions of the antenna apparatus, and image-processing and determination criteria for determining whether or not the antenna apparatus is in abnormal conditions are needed. Furthermore, in the case of automatically detecting abnormal conditions of an antenna apparatus from a captured image of the antenna apparatus having a flexible cable, the fact that a position of the cable may change for each image capture, may cause misdetection.

The present invention has been made in consideration of the foregoing circumstances and it is an objective of the present invention to detect abnormal conditions of an antenna automatically through a simple process using a small amount of data.

Solution to Problem

To achieve the foregoing objective, an antenna inspection system according to the first aspect of the present invention comprises: an antenna that includes a driving unit for driving the antenna; a camera that captures an image of the antenna; a control apparatus that includes an antenna control unit that controls the driving unit such that the antenna performs a programmed operation, and a camera control unit that controls the camera so as to capture an image of the antenna at each timing before a start and after an end of the programmed operation; and an antenna inspection apparatus that includes an image acquisition unit that acquires image data of the antenna that is captured by the camera, a storage unit that stores the image data of the antenna acquired by the image acquisition unit, and a comparing diagnosis unit that compares image data of the antenna before the start of the programmed operation with image data of the antenna after the end of the programmed operation, and diagnoses whether or not the antenna is in a normal state.

Advantageous Effects of Invention

The present invention is capable of detecting abnormal conditions of an antenna automatically through a simple process using a small amount of data.

DESCRIPTION OF EMBODIMENTS

An embodiment for carrying out the present invention will be explained in detail with reference to the drawings. In the drawings, the same or corresponding portion will be denoted by the same reference numeral.

Figure 1A:
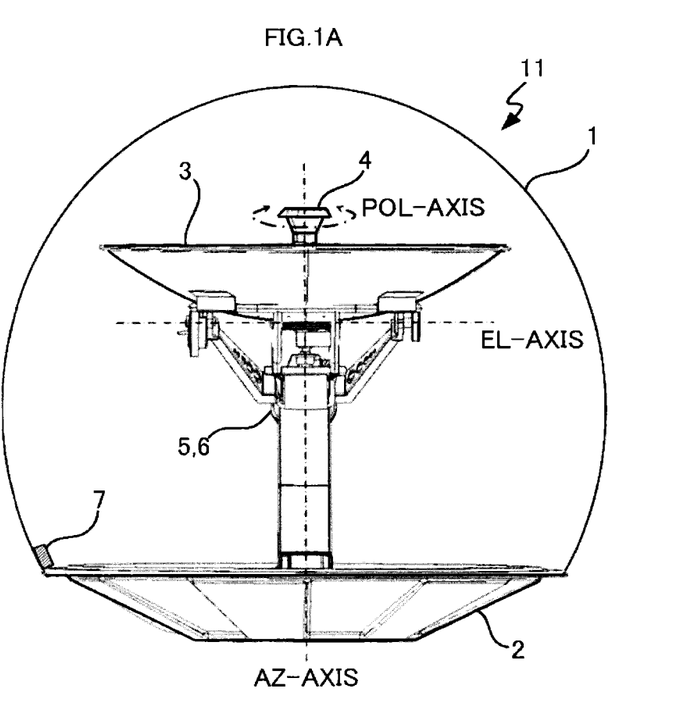
FIG. 1A is a front view illustrating an example of an antenna apparatus according to an embodiment of the present invention.
Figure 1B:
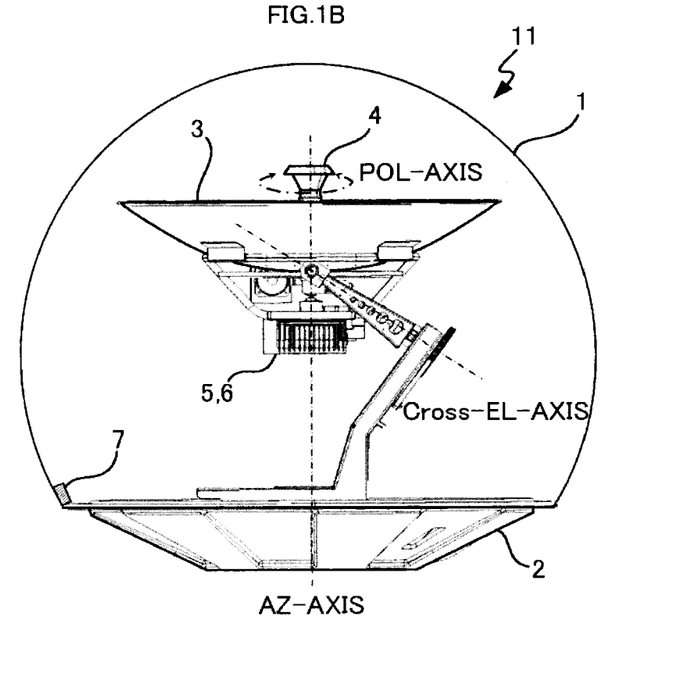
FIG. 1B is a side view illustrating the example of the antenna apparatus according to the embodiment of the present invention.

FIG. 1A is a front view illustrating an example of an antenna apparatus according to an embodiment of the present invention. FIG. 1B is a side view illustrating the antenna apparatus according to the embodiment of the present invention. An antenna apparatus 11 includes an antenna with a four-axis drive system consisting of an AZ drive axis, an EL drive axis, a Cross-EL drive axis and a POL drive axis. The antenna that is included in the antenna apparatus 11 according to the present embodiment is an automatic tracking antenna.

The antenna apparatus 11 includes an antenna that includes a main reflector 3, a sub-reflector 4 that reflects reflected waves from the main reflector 3, an amplification device 5, a frequency conversion device 6, an AZ-axis drive motor, an EL-axis drive motor, a Cross-EL-axis drive motor and a POL-axis drive motor, a dome 1 that covers the antenna, and a base 2 that serves as a cradle for the antenna. Furthermore, a camera 7 is mounted on inside of the dome or the base 2 of the antenna apparatus 11. The camera 7 is mounted at a position that does not interfere with the operation of the antenna.

Figure 2:
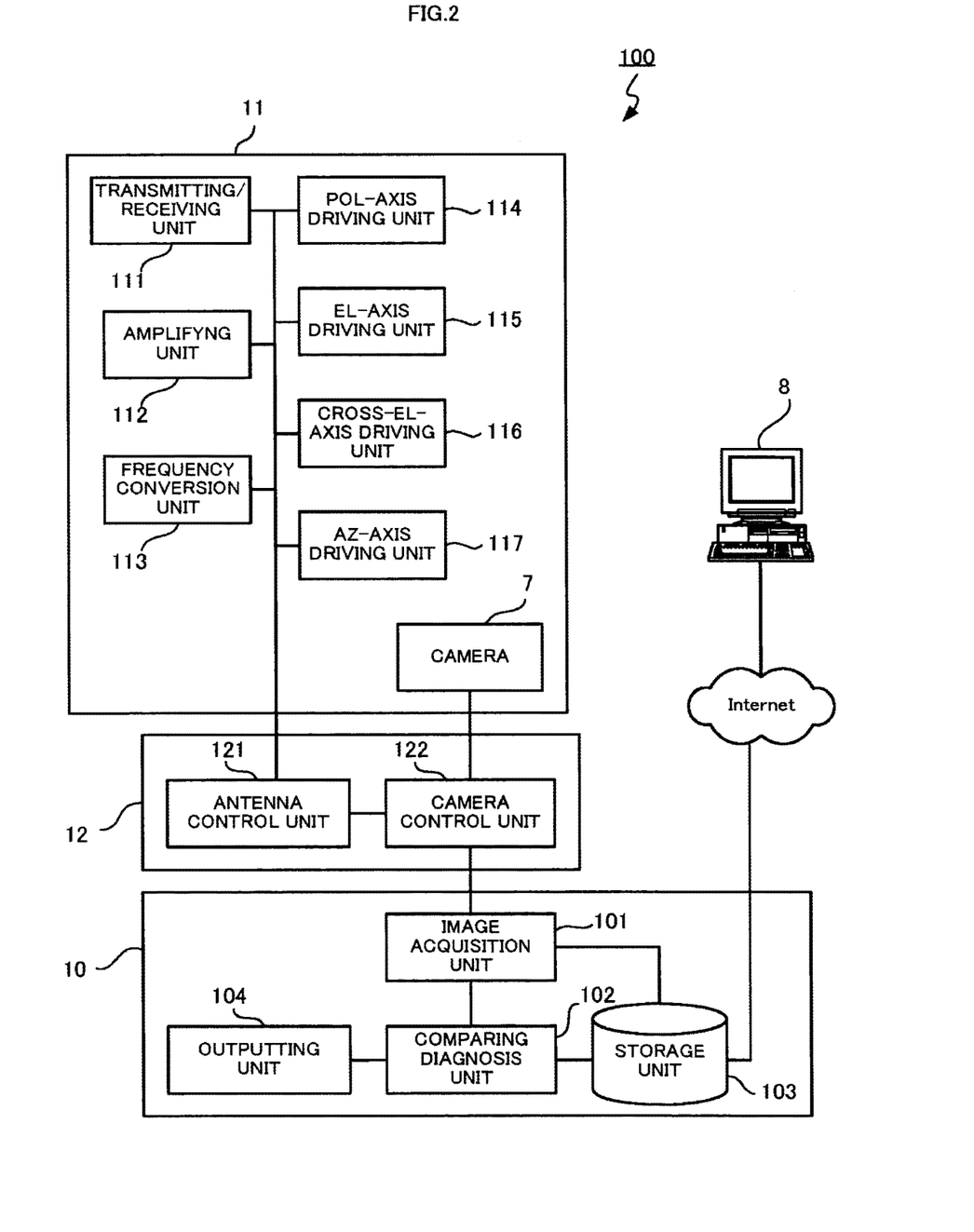
FIG. 2 is a block diagram illustrating the example of the configuration of the antenna inspection system according to the embodiment.

FIG. 2 is a block diagram illustrating the example of the configuration of the antenna inspection system according to the embodiment. The antenna inspection system 100 includes an antenna apparatus 11, a control apparatus 12 that controls the antenna apparatus 11 and the camera 7, and an antenna inspection apparatus 10 that detects abnormal conditions of the antenna apparatus based on an image of the antenna captured by the camera 7.

In the present embodiment, the antenna inspection system 100 includes a worker's terminal 8 that is connected with the antenna inspection apparatus 10 via the Internet. By configuring the antenna apparatus 11 to be accessible from the worker's terminal 8 via the Internet, a worker who performs the antenna maintenance is allowed to view image data of the antenna captured by the camera 7 and inspection result data, even from a remote location. Such visual checking is useful as a pre-inspection prior to the maintenance work.

The antenna apparatus 11 consists of, as a functional configuration, a transmitting/receiving unit 111, an amplifying unit 112, a frequency conversion unit 113, a POL-axis driving unit 114, an EL-axis driving unit 115, a Cross-EL-axis driving unit 116 and an AZ-axis driving unit 117.

The transmitting/receiving unit 111 includes a main reflector 3, a sub-reflector 4, and the like, and transmits and receives radio waves.

The amplifying unit 112 includes an amplification device 5 and the like, and amplifies the radio waves received by the transmitting/receiving unit 111.

The frequency conversion unit 113 includes a frequency conversion device 6 and the like, and converts the frequency of the radio waves amplified by the amplifying unit 112.

The POL-axis driving unit 114 includes a POL-axis drive motor and the like, and operates according to the instruction data transmitted from the control apparatus 12.

The EL-axis driving unit 115 includes an EL-axis drive motor and the like, and operates according to the instruction transmitted from the control apparatus 12.

The Cross-EL-axis driving unit 116 includes a Cross-EL-axis drive motor and the like, and operates according to instruction data transmitted from the control apparatus 12.

The AZ-axis driving unit 117 includes an AZ-axis drive motor and the like, and operates according to the instruction data transmitted from the control apparatus 12.

The POL-axis driving unit 114, the EL-axis driving unit 115, the Cross-EL-axis driving unit 116 and the AZ-axis driving unit 117 drive respective axis drive motors according to the instruction data received from the control apparatus 12 to control a position of the antenna directed to a satellite, that is, the position and attitude of the main reflector 3 and the sub reflector 4.

The camera 7 mounted on the antenna apparatus 11 captures an image of the antenna according to the instruction data transmitted from the control apparatus 12 and transmits image data that indicates the captured image to the control apparatus 12.

The control apparatus 12 includes, as a functional configuration, an antenna control unit 121 and a camera control unit 122.

Based on programmed angle-data, the antenna control unit 121 generates instruction data for instructing each of the AZ-axis, EL-axis, Cross-EL-axis and POL-axis drive motors to rotate a clockwise direction or a counter-clockwise direction. Then, the antenna control unit 121 transmits the instruction data to each of the POL-axis driving unit 114, the EL-axis driving unit 115, the Cross-EL-axis driving unit 116 and the AZ-axis driving unit 117.

The antenna control unit 121 generates instruction data for executing a programmed initial operation, i.e., origin detection, during a startup sequence after the power is switched-on, and transmits the instruction data to the antenna apparatus 11. The origin detection is an operation for detecting the zero point of an axis. Although the origin detection may be started in any attitude, this operation finally results in a predetermined attitude that refers to the zero point. The origin detection is executed for each axis. The predetermined attitude that refers to the zero point after the end of the origin detection is determined for each axis.

Upon activating the origin detection program after the power is switched-on, the antenna control unit 121 transmits start notification data that notifies of the start of the origin detection, to the camera control unit 122. Furthermore, the antenna control unit 121 starts the origin detection for the next axis upon receiving from the camera control unit 122 image-capturing end notification data that notifies that the image-capturing has ended. In addition, each time an origin detection for each axis is ended, the antenna control unit 121 transmits end notification data that notifies of the end of the origin detection, to the camera control unit 122.

Each time receiving the start notification data and the end notification data from the antenna control unit 121, the camera control unit 122 generates instruction data that instructs the camera 7 to capture an image, and transmits the instruction data to the camera 7. Through this, the camera control unit 122 controls a timing at which the camera 7 captures an image. Furthermore, upon receiving image data from the camera 7, the camera control unit 112 transmits the image data to the antenna inspection apparatus 10 and transmits the image-capturing end notification data that notifies that the image-capturing has ended, to the antenna control unit 121.

The antenna inspection apparatus 10 includes, as a functional configuration, an image acquisition unit 101, a comparing diagnosis unit 102, storage unit 103 and an outputting unit 104.

The image acquisition unit 101 acquires from the control apparatus 12 image data that indicates the image of the antenna captured by the camera 7. The image acquisition unit 101 makes the storage unit 103 store the acquired image.

For each axis, the comparing diagnosis unit 102 compares image data before origin detection that is stored in the storage unit 103 with image data after the origin detection that is stored in the storage unit 103, and diagnoses whether or not each of the axis driving units of the antenna is in a normal state. When each of the axis driving units has no abnormal conditions, the origin detection can be executed; thus, the compared image data should be different. On the other hand, when each of the axis driving units has a trouble, the origin detection cannot be executed; thus, the compared image data is the same. The comparing diagnosis unit 102 generates inspection result data that indicates the diagnostic results, and causes the outputting unit 104 to output the inspection result data. The comparing diagnosis unit 102 makes the storage unit 103 store the inspection result data.

The storage unit 103 stores the image data acquired by the image acquisition unit 101. The storage unit 103 also stores normal image data that indicates an image of the antenna that is in a normal state and is in such an attitude that all of the axes are on the zero point. Furthermore, the storage unit 103 stores the inspection result data that indicates the diagnostic results of the comparing diagnosis unit 102.

The outputting unit 104 outputs, in the form of images and/or sounds, the inspection result data received from the comparing diagnosis unit 102. It should be noted that the worker's terminal 8 is not necessarily required when a worker who performs antenna maintenance can view the inspection result data that has been output with the outputting unit 104. On the other hand, the outputting unit 104 is not necessarily required, when a worker who performs antenna maintenance from a remote place accesses the antenna apparatus 11 by the worker's terminal 8 via the Internet and views the image data of the antenna captured by the camera 7 and the inspection result data.

Figure 3:
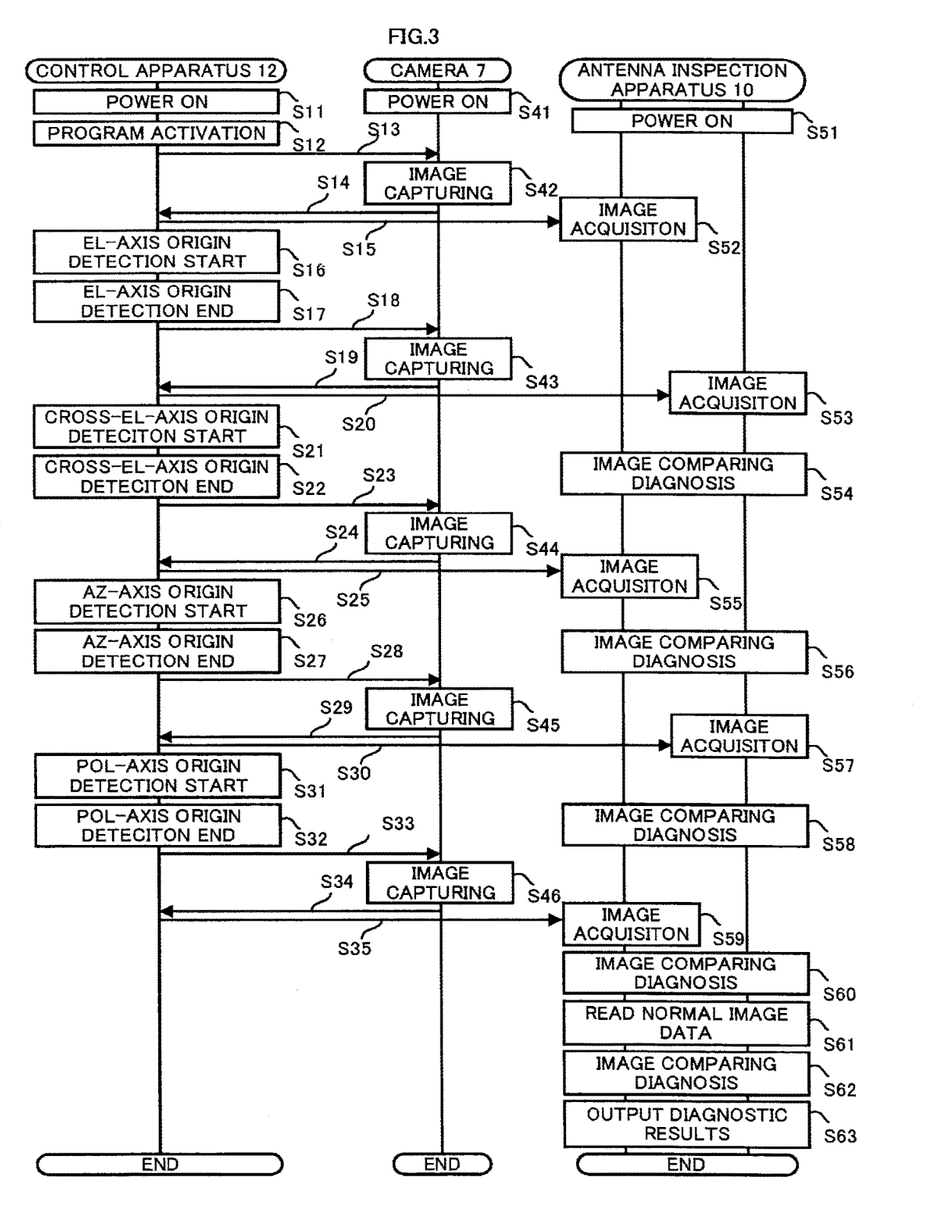
FIG. 3 is a flow chart illustrating the example of the operation of the antenna inspection according to the embodiment.

FIG. 3 is a flow chart illustrating the example of the operation of the antenna inspection of the antenna inspection system according to the embodiment. In the example shown in FIG. 3, the storage unit 103 of the antenna inspection apparatus 10 has two image memories (an image memory A and an image memory B), and stores the image data acquired by the image acquisition unit 101 in these two image memories alternately.

The antenna apparatus 11, the camera 7, the control apparatus 12, and the antenna inspection apparatus 10 are powered on (Steps S11, S41 and S51). Once powered-on, the antenna control unit 121 of the control apparatus 12 activates the origin detection program (Step S12) and transmits start notification data that notifies of the start of the origin detection, to the camera control unit 122. Upon receiving the start notification data from the antenna control unit 121, the camera control unit 122 generates instruction data that instructs the camera 7 to capture an image and transmits the instruction data to the camera 7 (Step S13).

Upon receiving from the control apparatus 12 the instruction data that instructs capturing image, the camera 7 captures an image of the antenna (Step S42). The camera control unit 122 of the control apparatus 12 acquires image data that indicates the captured image from the camera 7 (Step S14), and transmits the image data to the antenna inspection apparatus 10 (Step S15). The image acquisition unit 101 of the antenna inspection apparatus 10 acquires the image data transmitted from the camera control unit 122 (Step S52), and the image is stored data in the image memory A of the storage unit 103.

Upon receiving the image data from the camera 7 (Step S14), the camera control unit 122 of the control apparatus 12 transmits to the antenna control unit 121 image-capturing end notification data that notifies that the image-capturing has ended. Upon receiving the image-capturing end notification data, the antenna control unit 121 starts EL-axis origin detection (Step S16). When the EL-axis origin detection has ended (Step S17), the antenna control unit 121 transmits end notification data that notifies of the end of the origin detection, to the camera control unit 122. Upon receiving the end notification data from the antenna control unit 121, the camera control unit 122 generates instruction data that instructs the camera 7 to capture an image, and transmits the instruction data to the camera 7 (Step S18).

Upon receiving the instruction data that instructs capturing image from the control apparatus 12, the camera 7 captures an image of the antenna (Step S43). The camera control unit 122 of the control apparatus 12 acquires image data that indicates the captured image captured from the camera 7 (Step S19), and transmits the image data to the antenna inspection apparatus 10 (Step S20). The image acquisition unit 101 of the antenna inspection apparatus 10 acquires the image data transmitted from the camera control unit 122 (Step S53), and the image data is stored in the image memory B.

The comparing diagnosis unit 102 compares the image data before the EL-axis origin detection that is stored in the image memory A with the image data after the EL-axis origin detection that is stored in the image memory B, and diagnoses whether or not the EL-axis driving unit 115 is in a normal state (Step S54).

Upon receiving the image data from the camera 7 (Step S19), the camera control unit 122 of the control apparatus 12 transmits the image-capturing end notification data that notifies that the image-capturing has ended, to the antenna control unit 121. Upon receiving the image-capturing end notification data, the antenna control unit 121 starts Cross-EL-axis origin detection (Step S21). When the Cross-EL-axis origin detection has ended (Step S22), the antenna control unit 121 transmits end notification data that notifies of the end of the origin detection to the camera control unit 122. Upon receiving the end notification data from the antenna control unit 121, the camera control unit 122 generates instruction data that instructs the camera 7 to capture an image, and transmits the instruction data to the camera 7 (Step S23).

Upon receiving from the control apparatus 12 the instruction data that instructs capturing image, the camera 7 captures an image of the antenna (Step S44). The camera control unit 122 of the control apparatus 12 acquires image data that indicates the captured image from the camera 7 (Step S24), and transmits the image data to the antenna inspection apparatus 10 (Step S25). The image acquisition unit 101 of the antenna inspection apparatus 10 acquires the image data transmitted from the camera control unit 122 (Step S55), and the image data is stored in the image memory A.

The comparing diagnosis unit 102 compares the image data before the Cross-EL-axis origin detection that is stored in the image memory B (i.e., the image data after the EL-axis origin detection) with the image data after the Cross-EL-axis origin detection that is stored in the image memory A, and diagnoses whether or not the Cross-EL-axis driving unit 116 is in a normal state (Step S56).

Upon receiving image data from the camera 7 (Step S24), the camera control unit 122 of the control apparatus 12 transmits the image-capturing end notification data that notifies that image-capturing has ended, to the antenna control unit 121. Upon receiving the image-capturing end notification data, the antenna control unit 121 starts AZ-axis origin detection (Step S26). When the AZ-axis origin detection has ended (Step S27), the antenna control unit 121 transmits the end notification data that notifies that the origin detection has ended, to the camera control unit 122. Upon receiving the end notification data from the antenna control unit 121, the camera control unit 122 generates instruction data that instructs the camera 7 to capture an image, and transmits the instruction data to the camera 7 (Step S28).

Upon receiving from the control apparatus 12 the instruction data that instructs capturing image, the camera 7 captures an image of the antenna (Step S45). The camera control unit 122 of the control apparatus 12 acquires image data that indicates the captured image from the camera 7 (Step S29), and transmits the image data to the antenna inspection apparatus 10 (Step S30). The image acquisition unit 101 of the antenna inspection apparatus 10 acquires the image data transmitted from the camera control unit 122 (Step S57), and the image data is stored in the image memory B.

The comparing diagnosis unit 102 compares the image data before the AZ-axis origin detection that is stored in the image memory A (i.e., the image data after the Cross-EL-axis origin detection) with the image data after the AZ-axis origin detection that is stored in the image memory B, and diagnoses whether or not the AZ-axis driving unit 117 is in a normal state (Step S58).

Upon receiving the image data form the camera 7 (Step S29), the camera control unit 122 of the control apparatus 12 transmits image-capturing end notification data that notifies that the image-capturing has ended, to the antenna control unit 121. Upon receiving the image-capturing end notification data, the antenna control unit 121 starts POL-axis origin detection (Step S31). When the POL-axis origin detection has ended (Step S32), the antenna control unit 121 transmits end notification data that notifies of the end of the origin detection, to the camera control unit 122. Upon receiving the end notification data from the antenna control unit 121, the camera control unit 122 generates instruction data that instructs the camera 7 to capture an image, and transmits the instruction data to the camera 7 (Step S33).

Upon receiving from the control apparatus 12 the instruction data that instructs capturing image, the camera 7 captures an image of the antenna (Step S46) and completes the process. The camera control unit 122 of the control apparatus 12 acquires the image data that indicates the captured image from the camera 7 (Step S34), transmits the image data to the antenna inspection apparatus 10 (Step S35), and completes the process. The image acquisition unit 101 of the antenna inspection apparatus 10 acquires the image data transmitted from the camera control unit 122 (Step S59), and the image data is stored in the image memory A.

The comparing diagnosis unit 102 compares the image data before the POL-axis origin detection that is stored in the image memory B (i.e., the image data after the AZ-axis origin detection) with the image data after the POL-axis origin detection that is stored in the image memory A, and diagnoses whether or not the POL-axis driving unit 114 is in a normal state (Step S60).

The comparing diagnosis unit 102 is capable of determining whether or not each of the axis driving units is in a normal state, through a simple process of determining whether or not the image data most recently stored in the memory A coincides with the image data most recently stored in the memory B.

The comparing diagnosis unit 102 retrieves normal image data that indicates an image of the antenna that is in a normal state and is in such an attitude that all of the axes are on the zero point from the storage unit 103 (Step S61), compares the normal image data with the image data after the POL-axis origin detection that is stored in the image memory A, and diagnoses whether or not the origin detection was carried out normally (Step S62). In addition to abnormal conditions of the driving units, all other abnormal conditions existing in the appearance of the antenna apparatus 11 can be detected, through the comparison with the normal image data that indicates the image of the antenna that is in a normal state and in such an attitude that all of the axes are on the zero point.

The comparing diagnosis unit 102 causes an outputting unit 104 to output inspection result data that indicates the diagnostic results of Steps S54, S56, S58, S60 and S62 (Step S63). The comparing diagnosis unit 102 makes the storage unit 103 to store the inspection result data and completes the process. The inspection result data may include the image data stored in the storage unit 103.

As explained above, according to the antenna inspection system 100 of the present embodiment, abnormal conditions of the antenna can be automatically detected through a simple process that uses a small amount of data.

In particular, automatic tracking antenna apparatuses are installed in mobile stations, such as automobiles, ships, trains and airplanes, in many cases. Since a place to locate an apparatus within a mobile station is limited, small antenna inspection apparatuses are demanded. The antenna inspection apparatus 10 of the present embodiment can detect abnormal conditions of the antenna apparatus 11 through a simple process and can be realized with a small memory for storing data, and therefore allows a smaller size.

Furthermore, large ships, in particular, travel for a long time for each voyage, and thus performing maintenance work is not easy in view of transportation to get to the site. The antenna inspection system 100 of the present embodiment allows the worker's terminal 8 to access the antenna apparatus 11 via the Internet, so that the worker who performs the antenna maintenance can view the image data of the antenna captured by the camera 7 and the inspection result data, even from a remote location. This facilitates a pre-investigation prior to the maintenance work.

The present embodiment has illustrated an example of the antenna with a four-axis drive system consisting of an AZ drive axis, an EL drive axis, a Cross-EL drive axis and a POL drive axis. Not only this, automatic tracking antennas with a three-axis drive system consisting an AZ drive axis, an EL drive axis, and a POL drive axis and fixed antennas may also be used.

Figure 4:
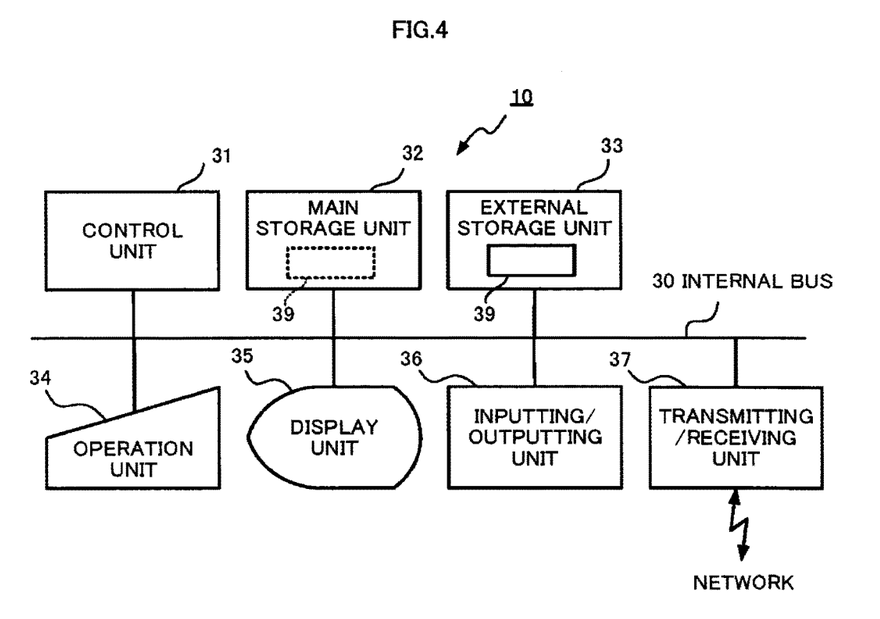
FIG. 4 is a block diagram illustrating the example of the hardware configuration of the image comparing device according to the embodiment of the present invention.

FIG. 4 is a block diagram illustrating the example of the hardware configuration of the antenna inspection apparatus according to the embodiment of the present invention. The antenna inspection apparatus 10 includes a control unit 31, a main storage unit 32, an external storage unit 33, an operation unit 34, a display unit 35, an inputting/outputting unit 36 and a transmitting/receiving unit 37, as shown in FIG. 4. The main storage unit 32, the external storage unit 33, the operation unit 34, the display unit 35, the inputting/outputting unit 36 and the transmitting/receiving unit 37 are all connected to the control unit 31 via internal buses.

The control unit 31 includes a CPU (Central Processing Unit) and the like, and executes the processing of the image acquisition unit 101 and the comparing diagnosis unit 102 of the antenna inspection apparatus 10, according to a control program 39 that is stored in the external storage unit 33.

The main storage unit 32 includes a RAM (Random-Access Memory) and the like, loads the control program 39 that is stored in the external storage unit 33, and is used as a work space of the control unit 31.

The external storage unit 33 includes a non-volatile memory, such as a flash memory, a hard disc, a DVD-RAM (Digital Versatile Disc Random-Access Memory) and a DVD-RW (Digital Versatile Disc Rewritable). In the external storage unit 33 a program that makes the control unit 31 execute the processing of the antenna inspection apparatus 10 is stored in advance. The external storage unit 33 supplies data that is stored in this program to the control unit 31 according to instructions of the control unit 31, and stores the data supplied by the control unit 31. The storage unit 103 is configured in the external storage unit 33.

The operation unit 34 includes a keyboard, a pointing device such as a mouse, and the like, and an interface device for connecting the keyboard, the pointing device such as a mouse, and the like, to the internal buses 30. When a user inputs information directly to the antenna inspection apparatus 10, the inputted information is supplied to the control unit 31 via the operation unit 34.

The display unit 35 is a CRT (Cathode Ray Tube) or an LCD (Liquid Crystal Display) and the like, and displays image data of the antenna captured by the camera 7 and inspection result data. When the worker inputs information directly to the antenna inspection apparatus 10, the display unit 35 displays an operation screen. The display unit 35 functions as the outputting unit 104.

The inputting/outputting unit 36 includes either a serial interface or a parallel interface. The inputting/outputting unit 36 is connected with the control apparatus 12. The inputting/outputting unit 36 functions as the image acquisition unit 101.

The transmitting/receiving unit 37 consists of a network termination device or a wireless communication device that connects with a network, and a serial interface or a LAN (Local Area Network) that connects with the network termination device or the wireless communication device. The transmitting/receiving unit 37 is connected with the worker's terminal 8 via a network. The transmitting/receiving unit 37 functions as an interface that allows access to the storage unit 103 from outside.

Processing of the image acquisition unit 101, the comparing diagnosis unit 102, the storage unit 103 and the inputting/outputting unit 104, of the antenna inspection apparatus 10 as shown in FIG. 2 is executed by the control program 39 using the control unit 31, the main storage unit 32, the external storage unit 33, the operation unit 34, the display unit 35, the inputting/outputting unit 36, the transmitting/receiving unit 37, and/or the like, as resources.

Besides, the above-described hardware configuration and flowchart are examples and may arbitrarily be changed and modified.

The core portion that executes the processing of the antenna inspection apparatus 10 that includes the control unit 31, the main storage unit 32, the external storage unit 33, the operation unit 34, the display unit 35, the inputting/outputting unit 36, the transmitting/receiving unit 37, the internal buses 30, and the like may be realized using an ordinary computer system, not using a special system. For example, a computer program for executing the aforementioned operations may be stored on a computer-readable recording medium (flexible disk, CD-ROM, DVD-ROM and/or the like), and the antenna inspection apparatus 10 that executes the aforementioned processing may be configured with a computer to which the computer program, distributed by a computer-readable recording medium, is installed. Furthermore, the antenna inspection apparatus 10 may be configured in such a way that the computer program is stored in the memory of a server computer connected to a network such as the Internet, and is downloaded by ordinary computer systems.

Furthermore, where functions of the antenna inspection apparatus 10 are divided between an OS (Operating System) and an application program, or are realized through cooperation between an OS and an application program, only an application program part may be stored in a recording medium or in a memory device.

Furthermore, a computer program may be superimposed on carrier waves and distributed via a communication network. For example, the above-described computer program may be posted on a BBS (Bulletin Board System) on a communication network, and distributed via the network. Then, the computer program may be configured in such a way that the above-described processing may be performed by activating this computer program and executing the program under control of OS in a similar manner as other application programs.

The above-described embodiment can be modified in various manners within the scope and spirit of the present invention. The above-described embodiment is given for explaining the present invention and is not intend to limit the scope and spirit of the present invention. It should be understood that the scope and spirit of the present invention is indicated by the appended claims rather than the embodiment. Various changes and modifications made within the limitation of the claims and the scope equivalents thereto are also included in the scope and spirit of the present invention.

The present application claims the benefit of a priority based on Japanese Patent Application No. 2012-56450 filed on Mar. 13, 2012, including the specification, claims, drawings and an abstract. The disclosure of this Japanese Patent Application is herein incorporated in this specification by reference.

INDUSTRIAL APPLICABILITY

The present invention can be used in, for example, an antenna inspection system for diagnosing abnormal conditions of an antenna.

REFERENCE SIGNS LIST

1. Dome
2. Base
3. Main reflector
4. Sub reflector
5. Amplification device
6. Frequency conversion device
7. Camera
8. Worker's terminal
10. Antenna inspection apparatus
11. Antenna apparatus
12. Control apparatus 31. Control unit
32. Main storage unit
33. External storage unit
34. Operation unit
35. Display unit
36. Inputting/outputting unit
37. Transmitting/receiving unit
39. Control program
100. Antenna inspection system
101. Image acquisition unit
102. Comparing diagnosis unit
103. Storage unit
104. Outputting unit
111. Transmitting/receiving unit
112. Amplifying unit
113. Frequency conversion unit
114. POL-axis driving unit
115. EL-axis driving unit
116. Cross-EL-axis driving unit
117. AZ-axis driving unit
121. Antenna control unit
122. Camera control unit

The invention claimed is:

1. An antenna inspection system comprising:
an antenna that includes a driving unit for driving the antenna; a camera that captures an image of the antenna;
a control apparatus that includes an antenna control unit that controls the driving unit such that the antenna performs a programmed operation, and
a camera control unit that controls the camera so as to capture an image of the antenna at each timing before a start and after an end of the programmed operation; and
an antenna inspection apparatus that includes an image acquisition unit that acquires image data of the antenna that is captured by the camera,
a storage unit that stores the image data of the antenna acquired by the image acquisition unit, and
a comparing diagnosis unit that compares image data of the antenna before the start of the programmed operation with image data of the antenna after the end of the programmed operation, and diagnoses whether or not the drive unit of the antenna is in a normal state, the normal state detected when the compared image data is different.

2. The antenna inspection system according to claim 1, wherein
the driving unit drive the antenna around a predetermined axis, and
the programmed operation is an origin detection operation for detecting a zero point of the predetermined axis.

3. The antenna inspection system according to claim 2, wherein
the storage unit stores normal image data that indicates an image of the antenna that is in a normal state and is in such an attitude that all of the predetermined axes are on the zero point; and
the comparing diagnosis unit further compares the normal image data with image data of the antenna after the end of the origin detection operation for all of the predetermined axes, and diagnoses whether or not the antenna is in a normal state.

4. The antenna inspection system according to claim 1, wherein the camera is mounted on inside of a dome that covers the antenna or a base that supports the antenna.

5. The antenna inspection system according to claim 1, further comprising an outputting unit that outputs inspection result data that indicates diagnostic results of the comparing diagnosis unit.

6. The antenna inspection system according to claim 1, further comprising a worker's terminal that connects with the antenna inspection apparatus via a network.

7. An antenna inspection apparatus comprising:
an image acquisition unit that acquires image data of an antenna that is captured by a camera at each timing before a start and after an end of a programmed operation of a drive unit of the antenna;
a storage unit that stores the image data of the antenna acquired by the image acquisition unit;
a comparing diagnosis unit that compares image data of the antenna before the start of the programmed operation with image data of the antenna after the end of the programmed operation, and diagnoses whether or not the drive unit of the antenna is in a normal state, the normal state detected when the compared image data is different.

8. The antenna inspection apparatus according to claim 7, wherein
the antenna is driven around a predetermined axis, and
the programmed operation is an origin detection operation for detecting a zero point of the predetermined axis.

9. The antenna inspection apparatus according to claim 8, wherein
the storage unit stores normal image data that indicates an image of the antenna that is in a normal state and is in such an attitude that all of the predetermined axes are on the zero point, and
the comparing diagnosis unit further compares the normal image data with image data of the antenna after the end of the origin detection for all of the predetermined axes, and diagnoses whether or not the antenna is in a normal state.

10. The antenna inspection apparatus according to claim 7, further comprising an outputting unit that outputs inspection result data that indicates diagnostic results of the comparing diagnosis unit.

11. An antenna inspection method comprising:
an antenna control step, executed by a control apparatus, of controlling a driving unit that is included in an antenna to drive the antenna, such that the antenna performs a programmed operation;
a camera control step, executed by the control apparatus, of controlling a camera so as to capture an image of the antenna at each timing before a start and after an end of the programmed operation;
an image acquisition step, executed by an antenna inspection apparatus, of acquiring image data of the antenna captured by the camera before the start and after the end of the programmed operation;
a storing step, executed by the antenna inspection apparatus, of storing the image data of the antenna acquired in the image acquisition step; and
a comparing diagnosis step, executed by the antenna inspection apparatus, of comparing image data of the antenna before the start of the programmed operation with image data of the antenna after the end of the programmed operation, and diagnosing whether or not the drive unit of the antenna is in a normal state, the normal state detected when the compared image data is different.

* * * * *